United States Patent [19]
Magome

[11] Patent Number: 5,355,223
[45] Date of Patent: Oct. 11, 1994

[54] APPARATUS FOR DETECTING A SURFACE POSITION

[75] Inventor: Nobutaka Magome, Kanagawa, Japan

[73] Assignee: Nikon Corporation, Tokyo, Japan

[21] Appl. No.: 974,236

[22] Filed: Nov. 10, 1992

[30] Foreign Application Priority Data

Nov. 12, 1991 [JP] Japan ................... 3-322298

[51] Int. Cl.$^5$ .............................. G01B 9/02
[52] U.S. Cl. ................... 356/375; 356/349; 356/358; 356/360; 356/381
[58] Field of Search .............. 356/372, 373, 375, 381, 356/382, 355, 356, 357, 358, 359, 360, 349; 250/561

[56] References Cited

U.S. PATENT DOCUMENTS

| | | | |
|---|---|---|---|
| 4,443,106 | 4/1984 | Yasuda et al. | 356/357 |
| 4,776,699 | 10/1988 | Yoshizumi | 356/360 |
| 4,886,363 | 12/1989 | Jungquist | 356/358 |
| 5,173,746 | 12/1992 | Brophy | 356/357 |

FOREIGN PATENT DOCUMENTS 0320418 12/1989 Japan ................... 356/349

Primary Examiner—Samuel A. Turner
Assistant Examiner—Hoa Q. Pham
Attorney, Agent, or Firm—Michael N. Meller

[57] ABSTRACT

An apparatus for detecting a surface position of an object to be detected from the direction of a line of vision. Even if a thin film is formed on the surface of the object, the apparatus is applicable to the detection of a position of the surface to be detected and the detection of a position of a surface of the thin film and the apparatus is also applicable to the detection of only a thickness of the thin film. The apparatus is designed so that a light beam of a frequency varied continuously and steadily is divided into two parts which are respectively directed to the object and a reference reflecting mirror, and after reflected beams from the object and the reference reflecting mirror have been combined on the same optical path, frequencies of the reflected beams are measured, thereby calculating the position of the object in accordance with a result of the frequency measurement.

3 Claims, 4 Drawing Sheets

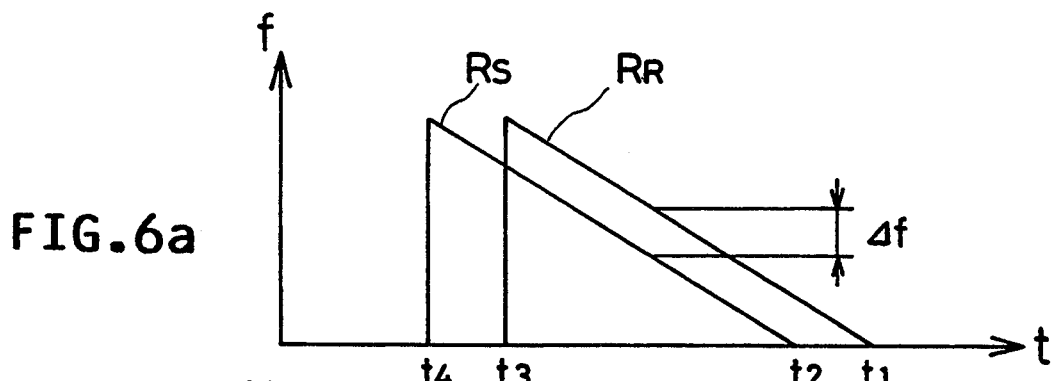
FIG.6a
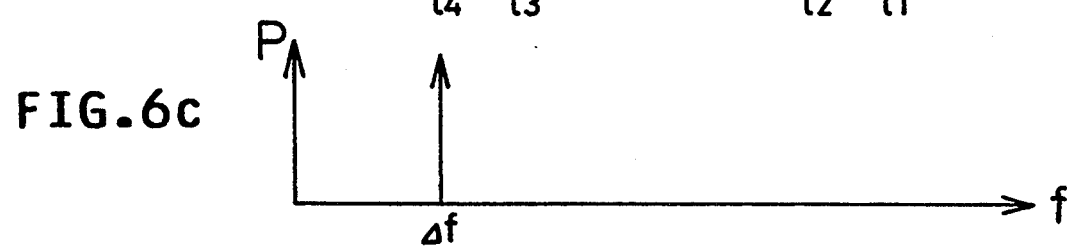
FIG.6b
FIG.6c
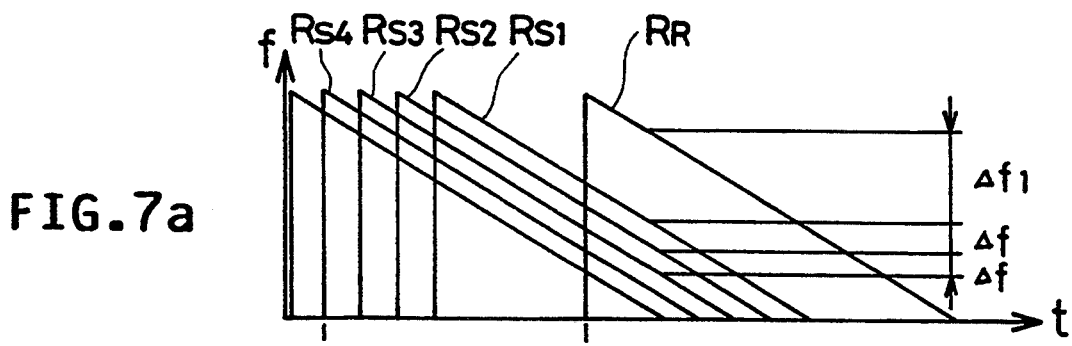
FIG.7a
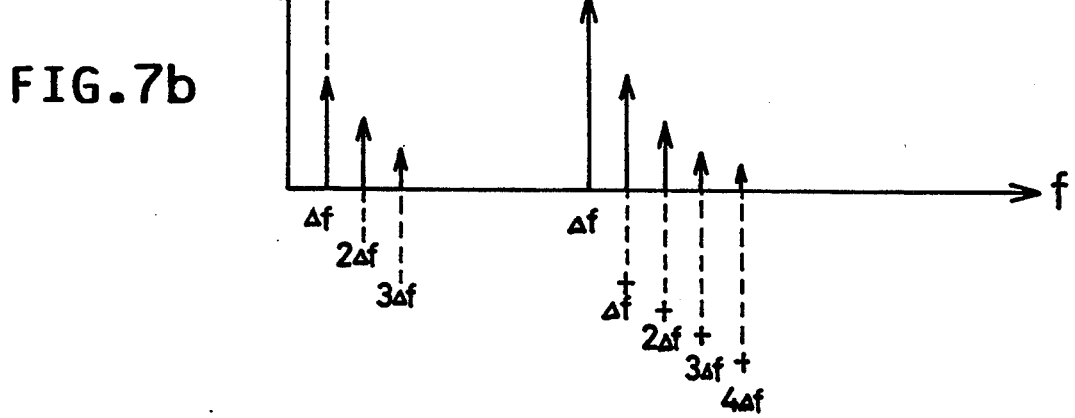
FIG.7b

APPARATUS FOR DETECTING A SURFACE POSITION

BACKGROUND OF THE INVENTION

1. Field of the Invention

This invention relates to a non-contact type detecting apparatus for detecting the surface position of an object to be detected, and more particularly there is provided an apparatus so adapted that even in a case where a transparent thin film is formed on the surface of an object to be detected, not only the surface position is detected accurately but also the thickness of the thin film is measured.

2. Description of the Prior Art

FIG. 1 shows an example of conventional surface position detecting apparatus. This apparatus detects the surface position of an object to be detected in a projection exposure apparatus and the object 1 to be detected is loaded on a stage 12 which is vertically movable below a projection optical system 30. The object of this apparatus is such that in order to align the surface position of the object 1 with the focal position (the mask pattern projection image plane) of the projection optical system 30 through the level control of the stage 12, the position of the object 1 in the direction of an optical axis AX is detected and the detected information is applied to the level control system of the stage 12. While, in this case, the description has been made by using for example a wafer constituting the object to be exposed as an example of the object 1 to be detected, the apparatus can also be used as a detecting apparatus for detecting the surface position of a work constituting an object to be examined in cases where the distance between a work and a tool or the like is adjusted in any other processing apparatus or the like.

In this detecting apparatus, as shown in FIG. 1, only the useful wavelength component is selected from the light beam from a light source 31 by a filter 32 and then it is used to illuminate a slit plate 34 through a lens system 33. Then, an image of the elongated slit of the slit plate 34 is projected and formed on the surface of the object 1 to be detected by a lens system 35. Further, after the reflection from the object 1 to be detected, the projected image is again formed on a slit plate 37 by an imaging lens system 36. The resulting image is transmitted through the slit of the slit plate 37 and then condensed on a photoelectric detector 39 by a condenser lens 38, thereby producing a detection signal 40. Then, a stage lifter 11 is operated in such a manner that the detection signal 40 attains for example the maximum and the stage 12 and the object 1 loaded on it are positioned in the height direction.

However, where a transparent film 1b is applied onto a reflecting surface 1a of the surface of the object 1 as shown in FIG. 2, an illuminating light $I_o$ for forming a slit image falls obliquely on the surface of the object 1 so that due to the internal reflections within the transparent film 1b, multiple images due to multiple reflected rays $R_1$, $R_2$, - - - are formed on the slit 37. In this case, since their imaging positions on the slit are different from one another, there is a difference in the center of gravity of light quantity between the cases where the transparent material is used and where no transparent material is used.

Therefore, there is a disadvantage that when effecting the position detection, it is difficult to make a distinction between the surface 1a of the object 1 and the surface of the thin film 1b and thus it is impossible to detect any specified surface.

SUMMARY OF THE INVENTION

It is the primary object of the present invention to provide an apparatus capable of accurately detecting the position of a surface of an object to be detected from the direction perpendicular to the object irrespective of the presence or absence of a transparent material on the surface of the object.

It is another object of the present invention to provide an apparatus which is not only capable of accurately detecting the position of a surface of an object to be detected even if a thin film is formed on the surface to be detected but also capable of measuring the position of the thin film surface and the thickness of the thin film.

To accomplish the above objects, in accordance with one aspect of the present invention there is thus provided a surface position detecting apparatus including a light source capable of continuously steadily varying its frequency, optical dividing means for dividing the light beam from the light source in a manner that one of the divided light beams is directed to a reflecting surface of an object to be detected and the other light beam is directed to a reflecting surface of a reference reflecting mirror, optical combining means for directing a reflected beam from the object and a reflected beam from the reference reflecting mirror onto the same optical path, measuring means for measuring the frequencies of the reflected beams combined by the optical combining means, and calculating means for calculating the position of the object to be detected in accordance with the result of the frequency measurement.

With the light source used with the apparatus according to the present invention, there is no particular limitation to its construction provided that it is capable of steadily varying (e.g., linearly sweeping) the wavelength (or frequency) of the light beam emitted. For instance, in the case of a semiconductor laser diode in which the frequency of its emitted laser beam is dependent on its current characteristic, the wavelength can be easily swept by steadily varying a driving current and thus this semiconductor laser is preferable for the light source used with the apparatus of the present invention. Also, by arranging an opto-acoustic device employing an ultrasonic transducer (AOM:Acoustic Optical Modulator) in the optical path from the light source to steadily vary the high-frequency sinusoidal wave applied to the opto-acoustic device, it is possible to sweep the wavelength (frequency). In particular, where a laser beam is used as the light source, there is an advantage that since the laser beam is a coherent light, the interference quality is improved.

The light beam from the light source is directed to the optical dividing means which in turn divides the light beam into two optical paths. The reference reflecting mirror is arranged in one of these optical paths and the other optical path directs the test beam to the object to be detected. Then, the reflected beam from the reference reflecting mirror is introduced as a reference beam into the optical combining means and the reflected beam from the object is also introduced as the test beam into the optical combining means through the different optical path. Thus, the optical combining means combines and directs the two beams to the same optical path and the combined beams are sent to the measuring means where the reflected beams interfer with each other and the frequencies of the interferring beams are detected.

Since the reflected beams (the reference beam and the test beam) are different in optical path from each other, when the two beams are combined, there is caused a difference in time between the reflected beams due to the difference between the optical paths of the two beams or depending on the position of the object to be detected relative to the installation position of the reference reflecting mirror. In this case, since the two light beams are ones whose frequencies vary linearly (the frequencies vary steadily with time), there always exits a constant frequency difference (or wavelength difference) due to the difference in time between the reflected beams. As a result, this combined beam produces a given beat and its beat frequency is proportional to the previously mentioned optical path difference. Therefore, by measuring the beat frequency of the combined beam by the measuring means, it is possible to detect the time difference based on the beat frequency (which is proportional to the optical path difference) so that the calculating means calculates these results to measure the position of the object to be detected.

Where a transparent material is applied (a thin film is formed) on the surface of the object, multiple reflected rays due to the reflection within the thin film are produced so that these reflected rays are also combined and detected as a test beam. Even in this case, only an optical path difference proportional to the thickness of the thin film is produced between the respective multiple reflected rays and the resulting frequency differences are always equal. As a result, when the multiple reflected rays are combined, a subspectrum of equal intervals is produced in the detected frequency values and the thickness of the thin film can be measured from these intervals. Also, it is possible to pick out only these multiple reflected rays and in this case the multiple reflected rays can be separated by suitably selecting the position of the reference reflecting mirror.

In short, the surface position detecting apparatus according to the present invention is advantageous in that instead of detecting the light quantity or the center of gravity of the light quantity as in the case of the prior art, the frequency of the test beam (actually its combined beam with the reference beam) and the resolution and reproducibility are extremely high, thus making it possible to measure even in the case of trace light quantity. Then, since a semiconductor laser or the like can be used as the light source, the test beam can be comprised of a coherent light beam thus improving the interference quality and enhancing the detection accuracy.

There is another advantage that by changing the position of the reference reflecting mirror, the frequency of the resulting beat can be varied and thus it is possible to utilize the light source in a region where there is no load from the stand-point of electric circuitry (e.g., gains and phase delays). In addition, the offset amount and the practical position of the vertical positioning can also be varied. Moreover, even if a thin film is formed on the object to be detected, not only the position of the object can be measured but also the thickness of the thin film can be measured.

Further, the present invention is not limited to cases where light is used as the test beam so that even if an electromagnetic wave, ultrasonic wave or the like is used, its frequency sweep can be made to effect their position observation. It is to be noted that in the case of light the sweep of a frequency means the sweep of a wavelength so that while the occurrence of a chromatic aberration may be considered possible, the amount of the actual sweep is very small and practically the light can be considered as a monochromatic light. The apparatus can be incorporated as an auto focusing sensor for microscopes or exposure apparatus in the TTL (through-the-lens) optical system (the system for detecting the surface of a wafer through the projection optical system 30).

The above and other objects, features and advantages of the present invention will become more apparent from the following description of its embodiments which are intended for no limitation when taken in conjunction with the accompanying drawings.

BRIEF DESCRIPTION OF THE DRAWINGS

FIG. 6a is a graph showing the variation with time of the detected light wave in the above embodiment.

FIG. 6b is a graph similarly showing the variation with time of the detection signal generated from the detector.

FIG. 6c is a graph showing the frequency spectrum of the detection signal.

FIG. 7a is a graph showing the variation with time of the light wave detected by multiple reflection in the above embodiment.

FIG. 7b is a graph similarly showing the frequency spectra of the combined signal.

DESCRIPTION OF THE PREFERRED EMBODIMENTS

Figure 1:
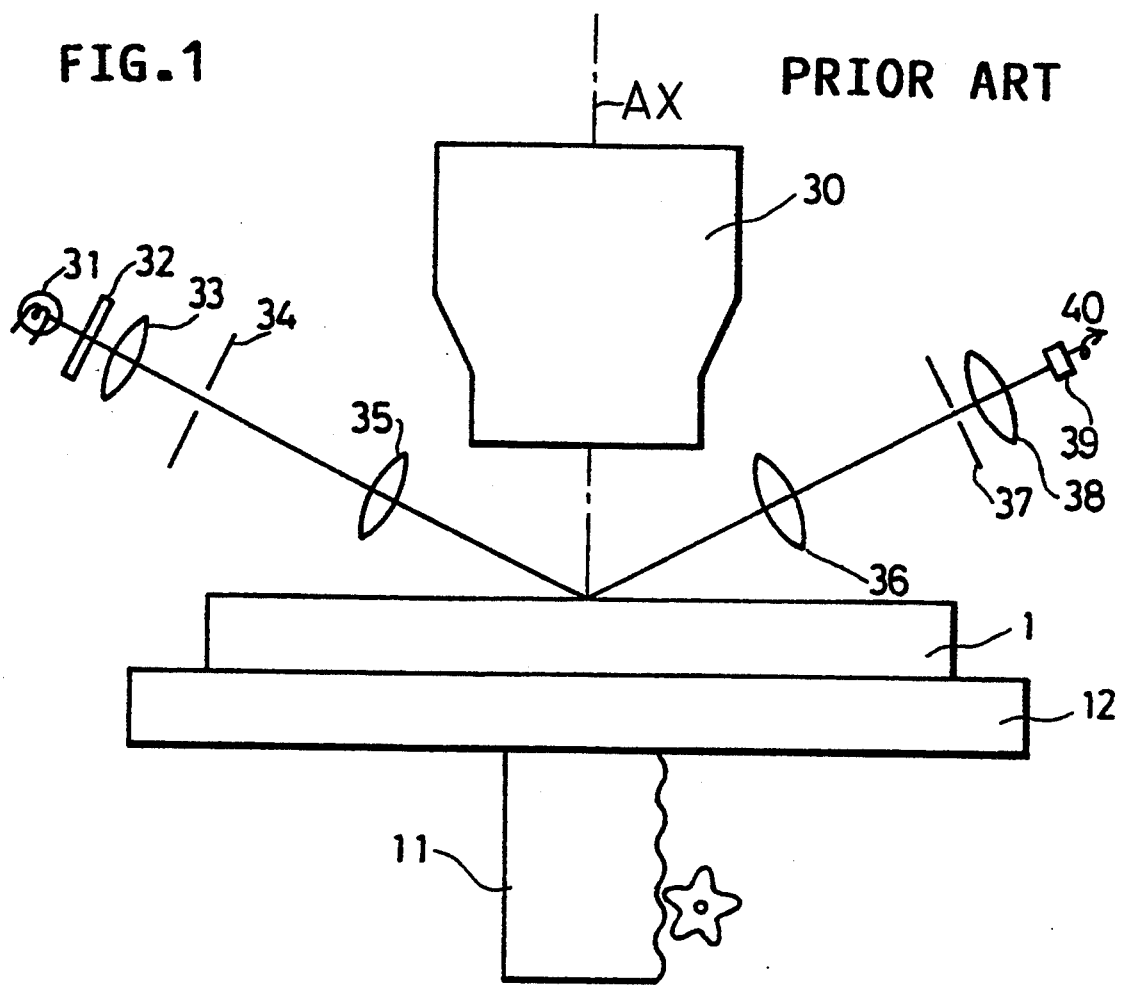
FIG. 1 is a schematic diagram showing an example of conventional position detecting apparatus from the standpoint of its principle.
Figure 2:
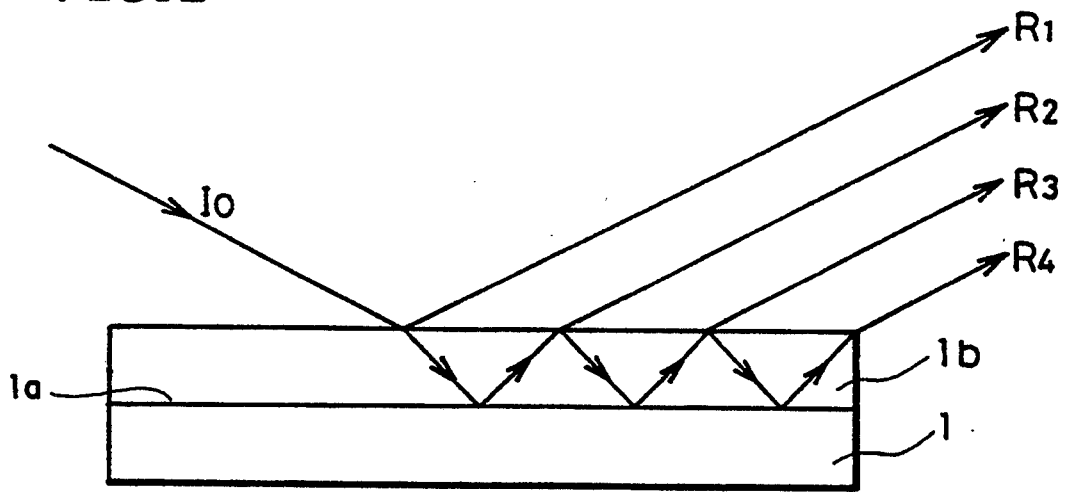
FIG. 2 is a schematic diagram showing the manner of multiple reflections in the thin film of the conventional apparatus.
Figure 3:
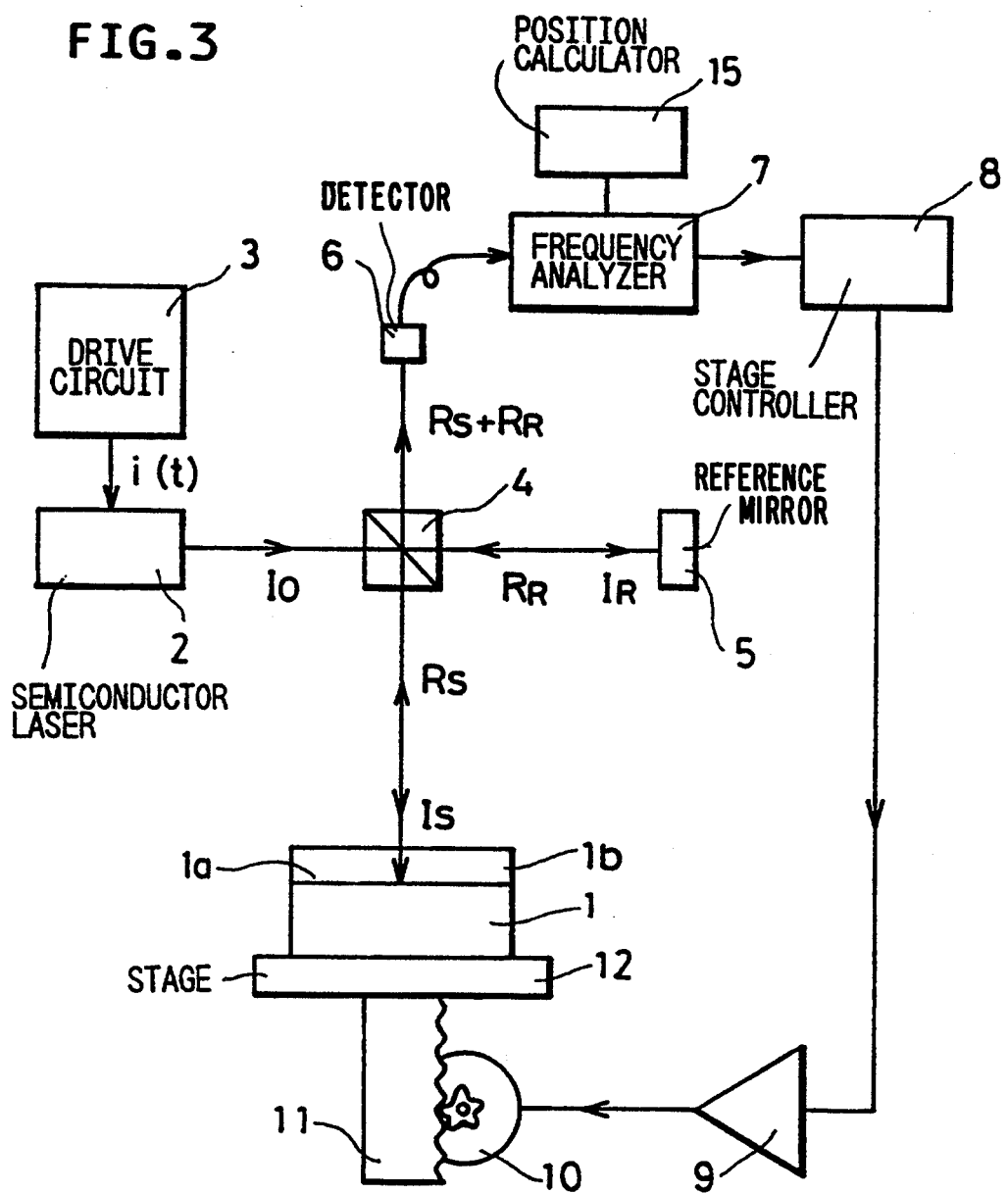
FIG. 3 is a schematic block diagram of a system in which a surface position detecting apparatus according to an embodiment of the present invention is applied to the control of a height position of an object.

An embodiment of the present invention will now be described with reference to the accompanying drawings. FIG. 3 shows an example of a system construction showing the case in which a surface position detecting apparatus according to the embodiment of the present invention is applied to the control of a height position of an object. More specifically, FIG. 3 schematically shows the construction of a system in which the height position of an object 1 to be detected, which is loaded on a vertically movable system 12, is detected and the object 1 is brought to the desired height position.

Figure 4:
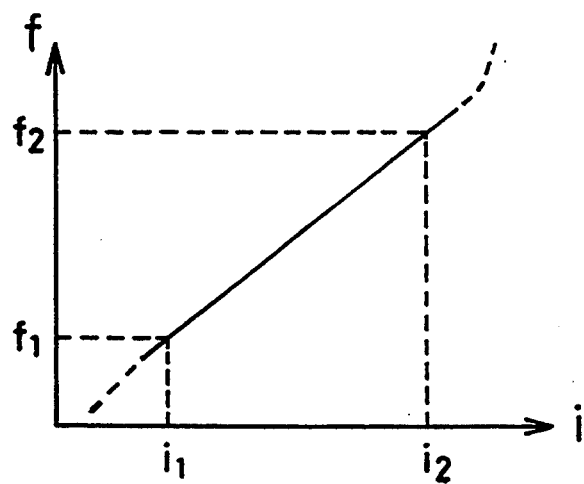
FIG. 4 is a graph showing the relation between the injection current and oscillation frequency of a semiconductor laser.
Figure 5:
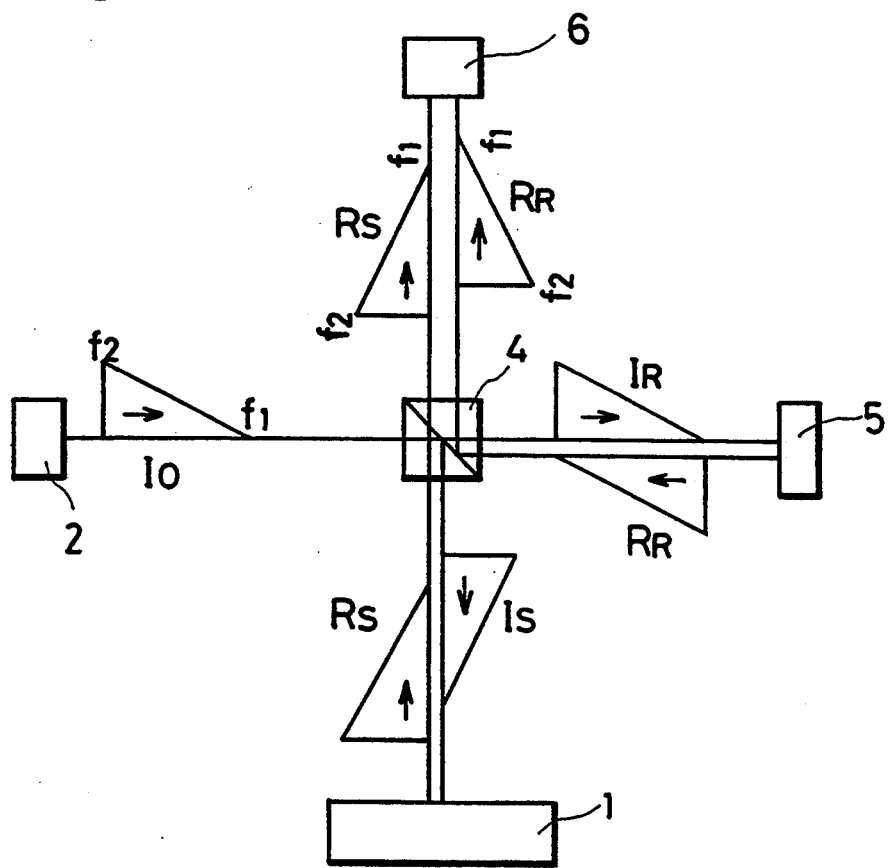
FIG. 5 is a schematic diagram showing the measuring principle of the optical path difference between the reference beam and the test beam in the above-mentioned embodiment.

This system uses a semiconductor laser for a light source 2 so that the semiconductor laser produces laser oscillations in accordance with the output current of a drive circuit 3 and the drive circuit 3 linearly varies its output current with time. As is generally known, the semiconductor laser has a characteristic so that its wavelength or frequency is varied by the effect of heat generation due to the injection current, etc. Thus, in this embodiment, as shown in FIG. 4, use is made of the region where the relation between the injection current i and the oscillation frequency f is linear and the drive circuit 3 generates as the injection current whose amplitude oscillates between values $i_1$ and $i_2$ in the form of sawteeth. FIG. 5 schematically shows the behaviors of such laser beam oscillation beam, reflected beams and combined beam on the optical paths corresponding to the system of FIG. 3 and these optical paths take the form similar for example to a Twyman-Green interferometer.

The light beam $I_o$ from the light source 2 is sent to a beam splitter 4 which in turn separates it into a transmitted beam and a reflected beam. The transmitted beam is sent as a reference beam $I_R$ to a reference mirror 5 so that the reflected beam from this mirror again falls on the beam splitter 4 and it is then directed to a detector 6. On the other hand, the light beam reflected and separated by the beam splitter 4 is sent as a test beam $I_S$ to the object 1 and it is reflected by the surface of the object 1 to fall again as a test reflected wave $R_S$ on the beam splitter 4. Then, the resulting light beam passed through the beam splitter 4 is combined with the reference reflected wave $R_R$ on the same optical path and directed to fall on the detector 6.

Assuming now that the oscillation wavelength of the semiconductor laser is constant, the light intensity corresponding to the difference between the optical path of $I_R-R_R$ and the optical path of $I_S-R_S$ is observed on the detector 6. In accordance with the present embodiment, however, the frequency of the light beam from the light source 2 is varied with time so that as shown schematically in FIG. 5, a shift is caused in the wave train in correspondence to the optical path difference and the light beams of the same frequency are not superposed on each other, thereby producing a light beat. The frequency of this light beat is constant and remains unchanged during a period when the light beams are superposed on each other.

Now explaining an example of this condition with reference to FIGS. 6a to 6c, FIG. 6a shows the variations with time of the frequency f of the two waves (the reference reflected wave $R_R$ and the test reflected wave $R_S$) arriving at the detector 6, and during the interval $t_2$ to $t_3$ the frequency difference (the beat frequency) of the two waves is always constant with the value of the beat frequency being proportional to the optical path difference (assuming that the path length of the wave to be detected is longer than that of the reference wave). FIG. 6b shows only the detection signal itself of the beat frequency so that during the interval $t_1$ to $t_2$ only the light quantity of the reference reflected wave $R_R$ is obtained and the amplitude variation of the detected beam itself is not grasped, thus indicating the constant light quantity. Also, the interval $t_1$ to $t_2$ of this case is the optical path difference in time.

Next, during the interval $t_2$ to $t_3$ the frequency difference of the two waves is constant at $\Delta f$ and therefore the beat frequency based on this frequency difference is detected. Where the optical path difference is excessively large, however, there is a problem that not only the interval $t_2$ to $t_3$ is decreased but also the value of $\Delta f$ is increased excessively, with the result that the detection circuit must have high frequency accommodations (e.g., the know-how on the designing and manufacture of a high-frequency circuit) and the handling of the problem becomes more difficult. Thus, in such a case, it is advantageous to adjust the position of the reference mirror 5 and thereby to decrease the beat frequency.

Here, if L represents the optical path difference, f the sweep speed and C the light velocity, the value of $\Delta f$ to be detected can be calculated from the following equation (1)

$$\Delta f = L/C \cdot f \tag{1}$$

Therefore, in order to select a suitable value for $\Delta f$, it is only necessary to change the optical path difference L and the sweep speed f or alternatively the sweep speed f may be changed in the event that the reference mirror 5 is fixed.

Then, where the light beam from the light source is a light beam of one cycle which varies in this manner, the position of the object 1 corresponding to the position of the reference mirror 5 can be calculated on the basis of the previously mentioned optical path difference in time ($t_1 \sim t_2$). Also, where a sawtooth light beam including a series of one-cycle amplitude variations as mentioned previously, for example, the position of the object 1 can be calculated on the basis of the detected beat frequency from the above equation (1).

On the other hand, where a thin film of the transparent material 1b or the like is formed on the surface of the object 1 thus involving multiple reflections, the reflected rays from the object 1 are caused to become multiple as shown in FIG. 7a. Assuming now that $R_R$ represents the reflected wave from the reference mirror, $R_{S1}$ the reflected wave from the transparent material 1b and $R_{S2}$, $R_{S3}$ - - - the reflected rays by multiple reflection, the reflected wave $R_R$ is especially strong in terms of oscillation intensity and its interference with the other rays is prominent.

As a result, the beat frequency $\Delta f_1$ due to the reflected waves $R_R$ and $R_{S1}$ is the lowest and then the beat frequency produced by the reflected waves $R_R$ and $R_{S2}$ becomes $\Delta f_1 + \Delta f'$. Here, $\Delta f'$ is based on the optical path difference s caused by the traveling of the light beam both ways through the thin film of the transparent material due to the reflections within the thin film and it is given by the following equation (2)

$$s = 2(n-1)d/C \cdot f \tag{2}$$

where n represents the refractive index of the transparent material and d the thickness of the transparent material.

Also, since the second and third reflections occur within the thin film, as shown in FIG. 7b, spectra of $\Delta f_1 + m\Delta f'$ (m is an integer) are produced and their individual frequency differences all become $\Delta f'$. Therefore, by detecting the previously mentioned multiple reflected rays and subjecting them to frequency analysis, it is possible to obtain the value of $\Delta f'$ and thus the thickness d of the thin film can be calculated from the above equation (2).

In addition, spectra of lower frequencies are also produced and they become $m\Delta f'$. In this case, even if the position of the reference mirror 5 is moved in the optical axis direction, the value of $m\Delta f'$ is not varied but only the value of $\Delta f'$ is varied (the optical path difference is varied). As a result, where the detection of the component $\Delta f_1$ is not clear, for example, it is possible to detect the component that varies with variation in the position of the reference mirror 5 to accurately determine the $\Delta f_1$ component. On the contrary, by detecting the variation of $\Delta f_1$, it is possible to measure variation in the position of the object 1 when the reference mirror 5 is fixed and also the Δf' component is constant even in the face of such variation thereby making it possible to simultaneously measure the thickness of the thin film.

Therefore, in accordance with the present embodiment as shown in FIG. 3, a detection signal corresponding to the intensity of the combined beam detected by the detector 6 is sent to a frequency analyzer 7 which in turn measures the frequency difference and the individual frequencies in accordance with the variation with time of the detection signal intensity. The thusly obtained frequency information is transmitted to position calculating means 15 thereby calculating the position of the object 1. The calculated position information is transmitted to stage control means 8 so that in accordance with the position information a command signal is sent from the stage control means 8 to a motor amplifier 9 and a stage lifter 11 is driven by a motor 10, thereby bringing the object 1 to the proper position.

From the foregoing description it will be seen that in accordance with the present embodiment the combined beam of the reference reflected beam and the test reflected beam is detected thereby detecting their frequencies and frequency difference and the optical path difference with respect to the reference mirror 5 (or the relative position of the object 1) is measured in accordance with the spectra of the respective components. Also, where is a transparent material on the surface of the object, it is possible to measure the thickness of the transparent material (when its refractive index is known) in accordance with the distribution of these spectra.

While the above-described embodiment supposes the case in which the variation of the oscillation wavelength (frequency) with the driving current of the semiconductor laser 2 has a linear relation, where such a linear relation is not fulfilled, it is possible to arrange so that in order that the oscillation wavelength (frequency) varies linearly with the driving signal (voltage), a driving current (injection current) is generated through a function circuit which receives the driving signal as an input to compensate the nonlinearity. In this case, even if the relation between the variations of the injection current and oscillation wavelength of the semiconductor laser is nonlinear, the relation between the variations of the driving signal and the oscillation wavelength becomes linear.

What is claimed is:

1. An apparatus for detecting a surface position of an object to be detected irrespective of the presence or absence of a transparent film on said object comprising:

a light source adapted to emit a light beam whose frequency varies continuously and steadily with time;

optical dividing means for dividing the light beam from said light source into parts whereby one of said divided light beams is directed to a surface of said object and the other of said divided light beams is directed to a reflecting surface of a reference mirror;

optical combining means for directing a reflected beam from said object and a reflected beam from said reference mirror onto the same optical path thereby forming a combined beam;

measuring means for measuring beat frequencies of said combined beam and the frequency difference between said beat frequencies in accordance with the variation with time of the intensity of said combined beam obtained by said optical combining means; and calculating means for calculating a position of said object and/or the thickness of said film in accordance with a result of said measurement.

2. An apparatus according to claim 1, wherein said light source including a semiconductor laser whose oscillation wavelength is varied linearly in proportion to variation in a driving signal.

3. An apparatus according to claim 1, wherein said reference mirror is adapted to change the position of its reflecting surface in an optical axis direction thereof.

* * * * *